US011354257B2

(12) United States Patent
Borgonovo et al.

(10) Patent No.: US 11,354,257 B2
(45) Date of Patent: Jun. 7, 2022

(54) CIRCUIT, CORRESPONDING DEVICE, SYSTEM AND METHOD (71) Applicant: STMicroelectronics S.r.l., Agrate Brianza (IT)

(72) Inventors: Giampiero Borgonovo, Giussano (IT); Lorenzo Re Fiorentin, Turin (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 17/224,772

(22) Filed: Apr. 7, 2021

(65) Prior Publication Data
US 2021/0342277 A1  Nov. 4, 2021

(30) Foreign Application Priority Data

Apr. 29, 2020 (IT) .................... 102020000009358

(51) Int. Cl.
| *G06F 17/16* | (2006.01) |
| *G06F 13/16* | (2006.01) |
| *G06F 7/50* | (2006.01) |
| *G06F 7/523* | (2006.01) |
| *G06F 13/28* | (2006.01) |
| *G06F 13/40* | (2006.01) |

(52) U.S. Cl.
CPC ............ *G06F 13/1668* (2013.01); *G06F 7/50* (2013.01); *G06F 7/523* (2013.01); *G06F 13/28* (2013.01); *G06F 13/4027* (2013.01)

(58) Field of Classification Search
None
See application file for complete search history.

(56) References Cited

U.S. PATENT DOCUMENTS

| 6,041,140 A | 3/2000 | Binns et al. | |
| 2002/0061012 A1* | 5/2002 | Thi | H04M 7/125 370/352 |
| 2005/0275427 A1* | 12/2005 | Wang | H03K 19/17736 326/41 |

(Continued)

OTHER PUBLICATIONS

Struharik, Rastislav et al., "CoNNA—Compressed CNN Hardware Accelerator", 2018 21st Euromicro Conference on Digital System Design, Aug. 29-31, 2018, 8 pages.

*Primary Examiner* — Hyun Nam
(74) *Attorney, Agent, or Firm* — Slater Matsil, LLP (57) ABSTRACT

An embodiment circuit comprises a set of input terminals configured to receive input digital signals which carry input data, a set of output terminals configured to provide output digital signals which carry output data, and computing circuitry configured to produce the output data as a function of the input data. The computing circuitry comprises a set of multiplier circuits, a set of adder-subtractor circuits, a set of accumulator circuits, and a configurable interconnect network. The configurable interconnect network is configured to selectively couple the multiplier circuits, the adder-subtractor circuits, the accumulator circuits, the input terminals and the output terminals in at least two processing configurations. In a first configuration, the computing circuitry is configured to compute the output data according to a first set of functions, and, in a second configuration, the computing circuitry is configured to compute the output data according to a different set of functions.

20 Claims, 5 Drawing Sheets

(56) References Cited

U.S. PATENT DOCUMENTS

| | | | |
|---|---|---|---|
| 2005/0275428 A1* | 12/2005 | Schlacter | H03K 19/17728 |
| | | | 326/41 |
| 2006/0109027 A1* | 5/2006 | Veredas-Ramirez | ............ |
| | | | H03K 19/17728 |
| | | | 326/37 |
| 2007/0283128 A1 | 12/2007 | Hoshaku | |
| 2008/0040790 A1* | 2/2008 | Kuo | G06F 21/604 |
| | | | 726/22 |
| 2009/0146690 A1* | 6/2009 | Vorbach | G06F 15/7867 |
| | | | 326/41 |
| 2012/0220308 A1* | 8/2012 | Ledlie | H04W 4/029 |
| | | | 455/456.1 |
| 2015/0208037 A1* | 7/2015 | Maurice | H04L 65/605 |
| | | | 348/14.09 |

* cited by examiner

CIRCUIT, CORRESPONDING DEVICE, SYSTEM AND METHOD

CROSS-REFERENCE TO RELATED APPLICATIONS

This application claims the benefit of Italian Application No. 102020000009358, filed on Apr. 29, 2020, which application is hereby incorporated herein by reference.

TECHNICAL FIELD

The description relates to digital signal processing circuits, such as hardware accelerators, and related methods, devices and systems.

BACKGROUND

A variety of real-time digital signal processing systems (e.g., for processing video data and/or image data, radar data, wireless communication data, as increasingly demanded in the automotive field) may involve processing a relevant amount of data per unit of time. In various applications, such processing may turn out to be highly demanding for purely core-based implementations (i.e., implementations involving general purpose microprocessors or microcontrollers running processing software).

Therefore, the use of hardware accelerators is becoming increasingly relevant in certain fields of data processing, since it facilitates speeding up the computation of certain algorithms. Properly designed hardware accelerators may reduce the processing time of specific operations compared to core-based implementations.

Conventional hardware accelerators as described in literature or available as commercial products may comprise different types of processing elements (also referred to as "mathematical units" or "mathematical operators"), with each processing element dedicated to computation of a specific operation. For instance, such processing elements may comprise multiply-and-accumulate (MAC) circuits and/or circuits configured to compute activation functions such as activation non-linear functions (ANLF) (e.g., coordinate rotation digital computer (CORDIC) circuits).

Each of the above-mentioned processing elements is typically designed for implementing a specific function (e.g., a radix-2 butterfly algorithm, a multiplication of complex vectors, a vector/matrix product, a trigonometric or exponential or logarithmic function, a convolution, etc.). Therefore, a conventional hardware accelerator typically comprises a variety of such different processing elements connected together through some kind of interconnect network. In some cases, the various processing elements are activated one at a time due to data dependencies and/or architecture limitations, leading to an inefficient usage of silicon area and of the available hardware resources.

On the other hand, a purely software-implemented, core-based approach (e.g., making use of a single instruction multiple data (SIMD (processor) may involve high clock frequencies in order to satisfy the typical bandwidth requirements of real-time systems, since in such case each processing element executes basic operations.

SUMMARY

An object of one or more embodiments is that of providing a hardware accelerator device which solves one or more of the above mentioned drawbacks.

In particular, one or more embodiments aim at providing a memory-based hardware accelerator device (also referred to with the acronym EDPA, Enhanced Data Processing Architecture, in the context of the present disclosure) comprising one or more processing elements. The processing elements in the hardware accelerator device may be reconfigurable, possibly at run time, so to provide increased flexibility of use and facilitate efficient computation of a variety of signal processing operations which may be particularly demanding in terms of resources (e.g., Fast Fourier Transform, digital filtering, implementation of artificial neural networks, etc.).

One or more embodiments may find application in real-time processing systems in which the acceleration of computationally demanding operations (e.g., vector/matrix product, convolution, FFT, radix-2 butterfly algorithm, multiplication of complex vectors, trigonometric or exponential or logarithmic function, etc.) may facilitate meeting certain performance requirements (e.g., in terms of processing time). This may be the case, for instance, in the automotive field.

According to one or more embodiments, such an object can be achieved by means of a circuit (e.g., a runtime reconfigurable processing unit) having the features set forth in the claims that follow.

One or more embodiments may relate to a corresponding device (e.g., a hardware accelerator circuit comprising one or more runtime reconfigurable processing units).

One or more embodiments may relate to a corresponding system (e.g., a system-on-chip integrated circuit comprising a hardware accelerator circuit).

One or more embodiments may relate to a corresponding method.

The claims are an integral part of the technical teaching provided herein in respect of the embodiments.

According to one or more embodiments, a circuit is provided which may comprise a set of input terminals configured to receive input digital signals which carry input data, and a set of output terminals configured to provide output digital signals which carry output data. The circuit may comprise computing circuitry configured to produce the output data as a function of the input data. The computing circuitry may comprise a set of multiplier circuits, a set of adder-subtractor circuits, a set of accumulator circuits, and a configurable interconnect network. The configurable interconnect network may be configured to selectively couple the multiplier circuits, the adder-subtractor circuits, the accumulator circuits, the input terminals and the output terminals in at least two processing configurations. In a first processing configuration, the computing circuitry may be configured to compute the output data according to a first set of functions, and in at least one second processing configuration, the computing circuitry may be configured to compute the output data according to a respective second set of functions. The second set of functions is different from the first set of functions.

One or more embodiments may thus provide increased flexibility, improved usage of hardware resources, and/or improved performance for parallel computation.

BRIEF DESCRIPTION OF THE DRAWINGS

One or more embodiments will now be described, by way of example only, with reference to the annexed figures, wherein.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

Throughout the figures annexed herein, like parts or elements are indicated with like references/numerals and a corresponding description will not be repeated for brevity.

The references used herein are provided merely for convenience and hence do not define the extent of protection or the scope of the embodiments.

Figure 1:
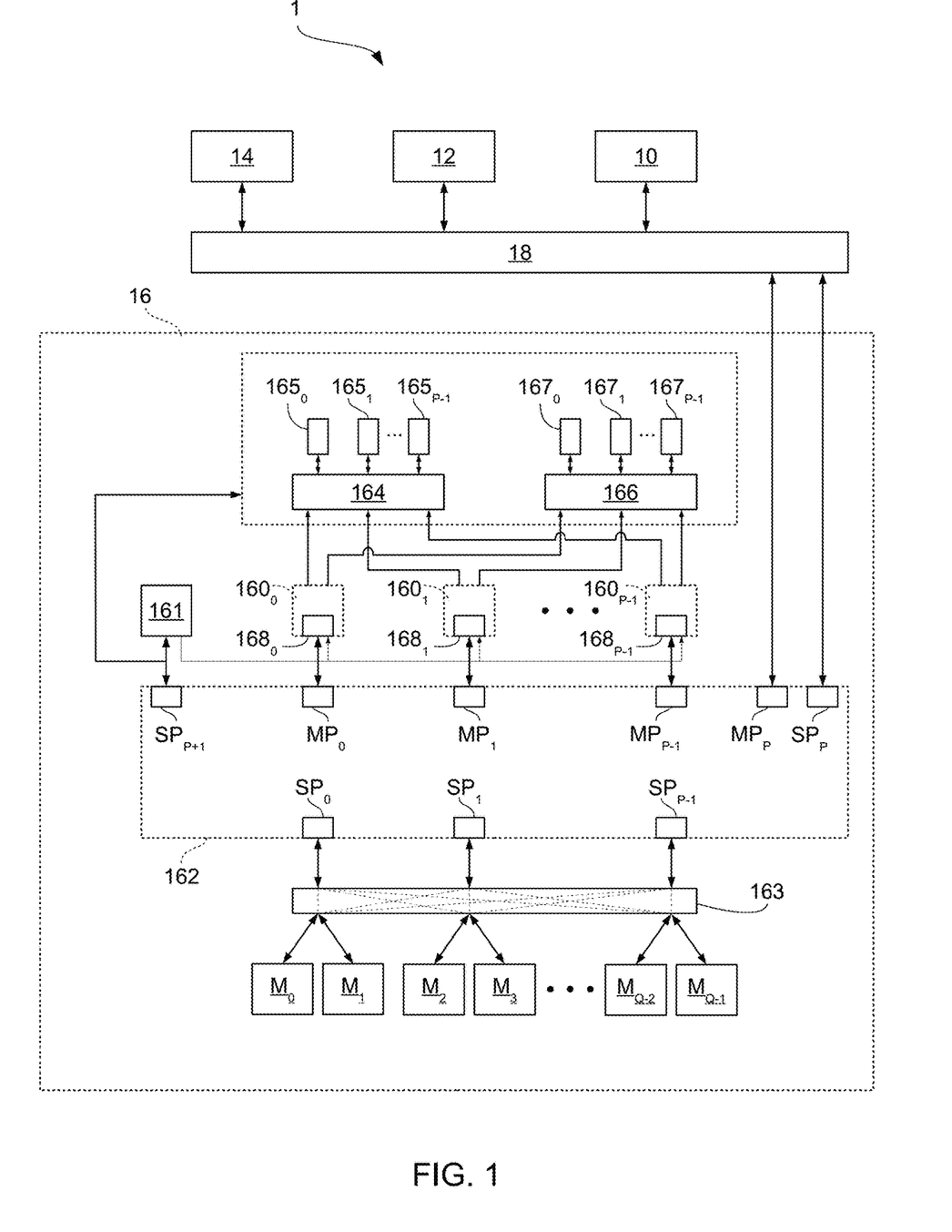
FIG. 1 is a circuit block diagram exemplary of an electronic system, such as a system-on-chip, according to one or more embodiments.

FIG. 1 is exemplary of an electronic system 1 according to one or more embodiments, such as a system-on-chip (SoC). The electronic system 1 may comprise various electronic circuits such as, for instance: a central processing unit 10 (CPU, e.g., a microprocessor), a main system memory 12 (e.g., a system RAM—Random Access Memory), a direct memory access (DMA) controller 14, and a hardware accelerator device 16.

As exemplified in FIG. 1, the electronic circuits in the electronic system 1 may be connected by means of a system interconnect network 18, e.g., a SoC interconnect.

It is an object of one or more embodiments to provide a (runtime) reconfigurable hardware accelerator circuit 16 designed for supporting execution of various (basic) arithmetic functions with improved flexibility of use. One or more embodiments may thus facilitate improving usage of silicon area and providing satisfactory processing performance, e.g., to satisfy the processing time requirements of real-time data processing systems.

As exemplified in FIG. 1, in one or more embodiments a hardware accelerator circuit 16 may comprise at least one (runtime) configurable processing element 160, preferably a number P of (runtime) configurable processing elements $160_0, 160_1, \ldots, 160_{P-1}$, and a set of local data memory banks M, preferably a number Q=2*P of local data memory banks $M_0, \ldots, M_{Q-1}$.

In one or more embodiments, the hardware accelerator circuit 16 may further comprise a local control unit 161, a local interconnect network 162, a local data memory controller 163, a local ROM controller 164 coupled to a set of local read-only memories 165, preferably a number P of local read-only memories $165_0, 165_1, \ldots, 165_{P-1}$, and a local configuration memory controller 166 coupled to a set of local configurable coefficient memories 167, preferably a number P of local configurable coefficient memories $167_0, 167_1, \ldots, 167_{P-1}$. For instance, the memories 167 may comprise volatile memories (e.g., RAM memories) and/or non-volatile memories (e.g., PCM memories).

Different embodiments may comprise a different number P of processing elements 160 and/or a different number Q of local data memory banks $M_0, \ldots, M_{Q-1}$. By way of example, P may be equal to 8 and Q may be equal to 16.

In one or more embodiments, the processing elements 160 may be configurable so as to support different (basic) processing functions with different levels of computational parallelism. For instance, a processing element 160 may support (e.g., based on a proper static configuration) different types of arithmetic (e.g., floating point single precision 32 bits, fixed-point/integer 32 bits, or 16 or 8 bits with parallel computation or vectored mode).

The processing elements 160 may comprise respective internal direct memory access (DMA) controllers $168_0, 168_1, \ldots, 168_{P-1}$ having a low complexity. In particular, a processing element 160 may be configured to retrieve input data from the local data memory banks $M_0, \ldots, M_{Q-1}$ and/or from the main system memory 12 through the respective direct memory access controller 168. The processing element 160 may thus elaborate the retrieved input data to generate processed output data. The processing element 160 may be configured to store the processed output data in the local data memory banks $M_0, \ldots, M_{Q-1}$ and/or in the main system memory 12 through the respective direct memory access controller 168.

Additionally, the processing elements 160 may be configured to retrieve input data from the local read-only memory 165 and/or from the local configurable coefficient memory 167 to perform such elaboration.

In one or more embodiments, providing a set of local data memory banks $M_0, \ldots, M_{Q-1}$ may facilitate processing data in parallel and reducing memory access conflicts.

Preferably, the local data memory banks $M_0, \ldots, M_{Q-1}$ may be provided with buffering (e.g., double buffering) which may facilitate recovering the memory upload time (write operation) and/or download time (read operation). In particular, each local data memory bank may be duplicated, so that data can be read (e.g., for being processed) from one of the two memory banks and (new) data can be stored (e.g., for being processed later) in the other memory bank at the same time. As a result, moving data may not negatively affect computation performances, as it may be masked.

In one or more embodiments, a double buffering scheme of the local data memory banks $M_0, \ldots, M_{Q-1}$ may be advantageous in combination with data processing in streaming mode or back to back (e.g., as applicable to a FFT N-point processor that is configured to elaborate continuous sequences of N data inputs).

In one or more embodiments, the local data memory banks $M_0, \ldots, M_{Q-1}$ may comprise memory banks having a limited storage capacity (and thus, a limited silicon footprint). In the exemplary case of a FFT processor, each of the local data memory banks may have a storage capacity of at least $(maxN)/Q$, where maxN is the longest FFT that the hardware is able to handle. Typical values in applications that involve a hardware accelerator may be the following:

N=4096 points, with each point being, for instance, a floating-point single precision complex number (real, img) having a size of 64 bits (or 8 bytes), P=8, resulting in Q=16, so that the storage capacity of each local data memory bank may be equal to (4096*8 bytes)/16=2 KB (KB=kilobyte).

In one or more embodiments, the local control unit 161 may comprise a register file including information for setting up the configuration of the processing elements 160. For instance, the local control unit 161 may set up the processing elements 160 to perform a specific algorithm as directed by a host application running on the central processing unit 10.

In one or more embodiments, the local control unit 161 may thus comprise a controller circuit of the hardware accelerator circuit 16. Such a controller circuit may configure (e.g., dynamically) each of the processing elements 160 for computing a specific (basic) function, and may configure each of the respective internal direct memory access controllers 168 with a specific memory access scheme and loop cycle.

In one or more embodiments, the local interconnect network 162 may comprise a low complexity interconnect system, e.g., based on a bus network of a known type such as an AXI4-based interconnect. For instance, the data parallelism of the local interconnect network 162 may be on 64 bits and the address width may be 32 bits.

The local interconnect network 162 may be configured to connect the processing elements 160 to the local data memory banks $M_0, \ldots, M_{Q-1}$ and/or to the main system memory 12. Additionally, the local interconnect network 162 may be configured to connect the local control unit 161 and the local configuration memory controller 166 to the system interconnect network 18.

In particular, the interconnect network 162 may comprise a set of P master ports $MP_0, MP_1, \ldots, MP_{P-1}$, each of these master ports being coupled to a respective processing element 160; a set of P slave ports $SP_0, SP_1, \ldots, SP_{P-1}$, each of these slave ports being couplable via the local data memory controller 163 to the local data memory banks $M_0, \ldots, M_{Q-1}$; a further pair of ports comprising a system master port $MP_P$ and a system slave port $SP_P$ configured for coupling to the system interconnect network 18 (e.g., in order to receive instructions from the central processing unit 10 and/or to access data stored in the system memory 12); and a still further slave port $SP_{P+1}$ coupled to the local control unit 161 and to the local configuration memory controller 166.

In one or more embodiments, the interconnect network 162 may be fixed (i.e., not reconfigurable).

In an exemplary embodiment (see, e.g., Table I-1 provided in the following, where an "X" sign indicates an existing connection between two ports), the interconnect network 162 may implement the following connections: each of the P master ports $MP_0, MP_1, \ldots, MP_{P-1}$ coupled to a processing element 160 may be connected to a respective slave port $SP_0, SP_1, \ldots, SP_{P-1}$ coupled to the local data memory controller 163; and the system master port $MP_P$ coupled to the system interconnect network 18 may be connected to the slave port $SP_{P+1}$ coupled to the local control unit 161 and to the local configuration memory controller 166.

Table I-1 provided in the following summarizes such exemplary connections implemented by means of the interconnect network 162.

TABLE I-1

|  | $SP_0$ | $SP_1$ | ... | $SP_{P-1}$ | $SP_P$ | $SP_{P+1}$ |
|---|---|---|---|---|---|---|
| $MP_0$ | X |  |  |  |  |  |
| $MP_1$ |  | X |  |  |  |  |
| ... |  |  | ... |  |  |  |
| $MP_{P-1}$ |  |  |  | X |  |  |
| $MP_P$ |  |  |  |  |  | X |

In another exemplary embodiment (see, e.g., Table I-2 provided in the following), the interconnect network 162 may further implement the following connections: each of the P master ports $MP_0, MP_1, \ldots, MP_{P-1}$ may be connected to the system slave port $SP_P$ coupled to the system interconnect network 18. In this way, connectivity may be provided between any processing element 160 and the SoC via the system interconnect network 18.

Table I-2 provided in the following summarizes such exemplary connections implemented by means of the interconnect network 162.

TABLE I-2

|  | $SP_0$ | $SP_1$ | ... | $SP_{P-1}$ | $SP_P$ | $SP_{P+1}$ |
|---|---|---|---|---|---|---|
| $MP_0$ | X |  |  |  | X |  |
| $MP_1$ |  | X |  |  | X |  |
| ... |  |  | ... |  | ... |  |
| $MP_{P-1}$ |  |  |  | X | X |  |
| $MP_P$ |  |  |  |  |  | X |

In another exemplary embodiment (see, e.g., Table I-3 provided in the following, where an "X" sign indicates an existing connection between two ports, and an "X" in parentheses indicates an optional connection), the interconnect network 162 may further implement the following connection: the system master port $MP_P$ coupled to the system interconnect network 18 may be connected to at least one of the slave ports $SP_0, SP_1, \ldots, SP_{P-1}$ (here, the first slave port $SP_0$ in the set of P slave ports $SP_0, SP_1, \ldots, SP_{P-1}$). In this way, connection may be provided between the master port $MP_P$ and (any) slave. According to the specific application of the system 1, connection of the master port $MP_P$ may be extended to a plurality of (e.g., all) the slave ports $SP_0, SP_1, \ldots, SP_{P-1}$. Connection of the master port $MP_P$ to at least one of the slave ports $SP_0, SP_1, \ldots, SP_{P-1}$ may be used (only) to load the input data to be processed into the local data memory banks $M_0, \ldots, M_{Q-1}$, insofar as all memory banks may be accessed via a single slave port. Loading input data can be done using only one slave port, while processing the data by means of parallel computation may take advantage of using a plurality (e.g., all) of the slave ports $SP_0, SP_1, \ldots, SP_{P-1}$.

Table I-3 provided in the following summarizes such exemplary connections implemented by means of the interconnect network 162.

TABLE I-3

|      | $SP_0$ | $SP_1$ | ... | $SP_{P-1}$ | $SP_P$ | $SP_{P+1}$ |
|------|--------|--------|-----|------------|--------|------------|
| $MP_0$ | X |   |   |   | X |   |
| $MP_1$ |   | X |   |   | X |   |
| ... |   |   | ... |   | ... |   |
| $MP_{P-1}$ |   |   |   | X | X |   |
| $MP_P$ | X | (X) | (X) | (X) |   | X |

In one or more embodiments, the local data memory controller 163 may be configured to arbitrate access (e.g., by the processing elements 160) to the local data memory banks $M_0, \ldots, M_{Q-1}$. For instance, the local data memory controller 163 may use memory access schemes selectable as a function of a signal received from the local control unit 161 (e.g., for computation of a specific algorithm).

In one or more embodiments, the local data memory controller 163 may translate input read/write transaction bursts (e.g., AXI bursts) generated by the read/write direct memory access controllers 168 into a sequence of read/write memory accesses, according to a specified burst type, burst length and memory access scheme.

Therefore, one or more embodiments of a hardware accelerator circuit 16 as exemplified in FIG. 1 may aim at reducing the complexity of the local interconnect network 162 by delegating to the local data memory controller 163 the implementation of the (reconfigurable) connections between the processing elements and the local data memory banks.

In one or more embodiments, the local read-only memories $165_0, 165_1, \ldots, 165_{P-1}$ accessible by the processing elements 160 via the local ROM controller 164 may be configured to store numeric factors and/or fixed coefficients for implementation of specific algorithms or operations (for instance, twiddle factors for FFT computation or other complex coefficients). The local ROM controller 164 may implement specific address schemes.

In one or more embodiments, the local configurable coefficient memories $167_0, 167_1, \ldots, 167_{P-1}$ accessible by the processing elements 160 via the local configuration memory controller 166 may be configured to store application-dependent numeric factors and/or coefficients which can be configured by software (for instance, coefficients for implementing a FIR filter or a beamforming operation, weights of a neural network, etc.). The local configuration memory controller 166 may implement specific address schemes.

In one or more embodiments, the local read-only memories $165_0, 165_1, \ldots, 165_{P-1}$ and/or the local configurable coefficient memories $167_0, 167_1, \ldots, 167_{P-1}$ may advantageously be split into a number P of banks equal to the number of processing elements 160 comprised in the hardware accelerator circuit 16. This may facilitate avoiding conflicts during parallel computations. For instance, each of the local configurable coefficient memories may be configured to provide in parallel the full set of coefficients required for each processing element 160.

Figure 2:
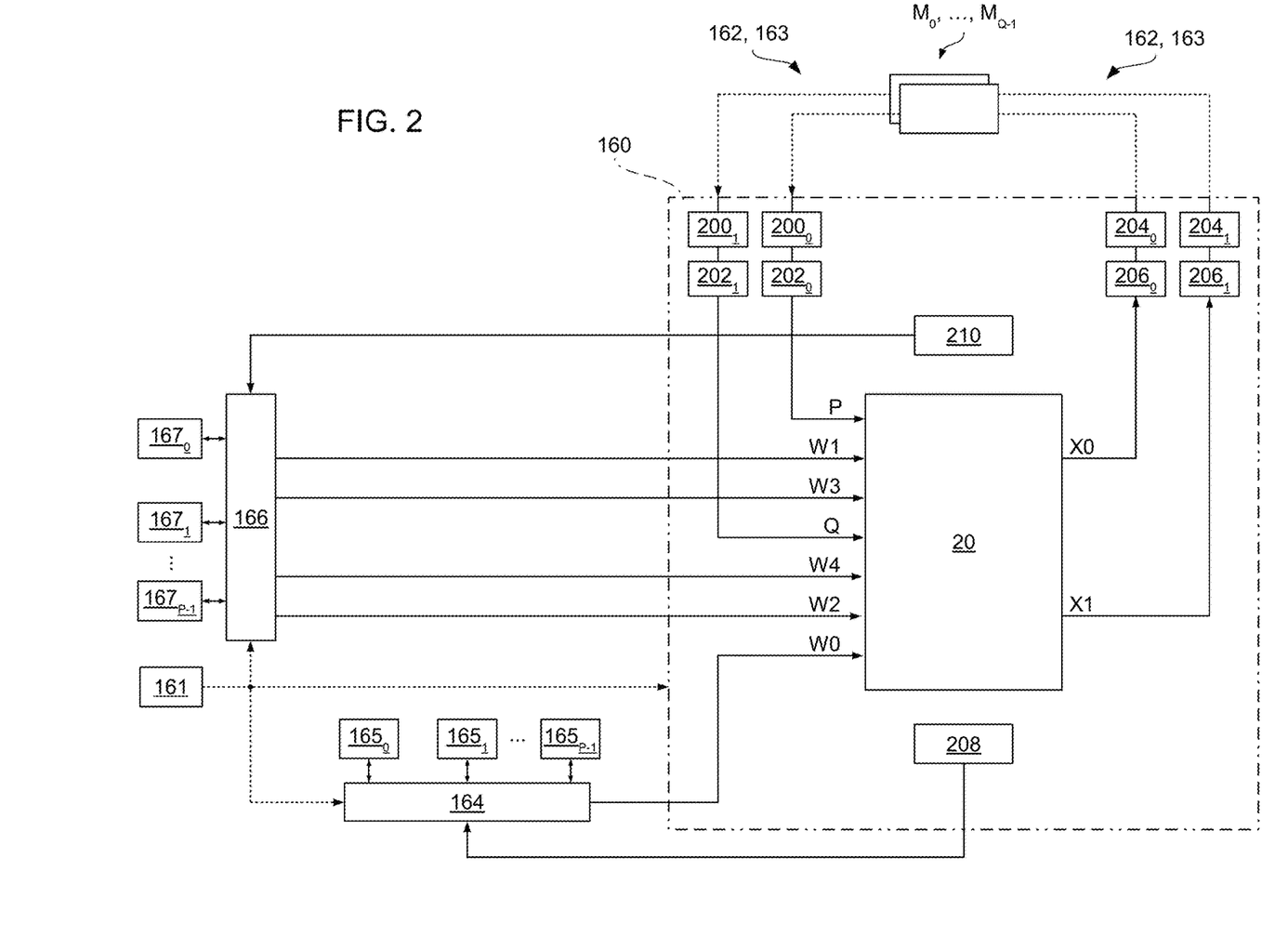
FIG. 2 is a circuit block diagram exemplary of an electronic device implementing a hardware accelerator according to one or more embodiments.

FIG. 2 is a circuit block diagram exemplary of one or more embodiments of a processing element 160 and related connections to the local ROM controller 164, the local configuration memory controller 166, and the local data memory banks $M_0, \ldots, M_{Q-1}$ (with the dotted lines schematically indicating a reconfigurable connection between the processing element 160 and the local data memory banks $M_0, \ldots, M_{Q-1}$ via the local interconnect network 162 and the local data memory controller 163).

A processing element 160 as exemplified in FIG. 2 may be configured to receive a first input signal P (e.g., a digital signal indicative of a binary value from a local data memory bank $M_0, \ldots, M_{Q-1}$, possibly a complex data having a real part and an imaginary part) via a respective read direct memory access $200_0$ and a buffer register $202_0$ (e.g., a FIFO register); a second input signal Q (e.g., a digital signal indicative of a binary value from a local data memory bank $M_0, \ldots, M_{Q-1}$, possibly a complex data having a real part and an imaginary part) via a respective read direct memory access $200_1$ and a buffer register $202_1$ (e.g., a FIFO register); a first input coefficient W0 (e.g., a digital signal indicative of a binary value from a local read-only memory 165); and a second, a third, a fourth and a fifth input coefficients W1, W2, W3, W4 (e.g., digital signals indicative of respective binary values from a local configurable coefficient memory 167).

In one or more embodiments, a processing element 160 may comprise a number of read direct memory access 200 equal to the number of input signals P, Q.

It will be understood that the number of input signals and/or input coefficients received at the processing element 160 may vary in different embodiments.

The processing element 160 may comprise a computing circuit 20 configurable (possibly at runtime) to process the input values P, Q and the input coefficients W0, W1, W2, W3, W4 to produce a first output signal X0 (e.g., a digital signal indicative of a binary value to be stored in a local data memory bank $M_0, \ldots, M_{Q-1}$ via a respective write direct memory access $204_0$ and buffer register $206_0$ such as a FIFO register) and a second output signal X1 (e.g., a digital signal indicative of a binary value to be stored in a local data memory bank $M_0, \ldots, M_{Q-1}$ via a respective write direct memory access $204_1$ and buffer register $206_1$ such as a FIFO register).

In one or more embodiments, a processing element 160 may comprise a number of write direct memory access 204 equal to the number of output signals X0, X1.

In one or more embodiments, programming of the read and/or write direct memory access 200, 204 (which are comprised in the direct memory access controllers 168) may be performed via an interface (e.g., an AMBA interface), which may allow to access internal control registers located in the local control unit 161.

Additionally, a processing element 160 may comprise a ROM address generator circuit 208 coupled to the local ROM controller 164 and a memory address generator circuit 210 coupled to the local configuration memory controller 166 to manage data retrieval therefrom.

Figure 3:
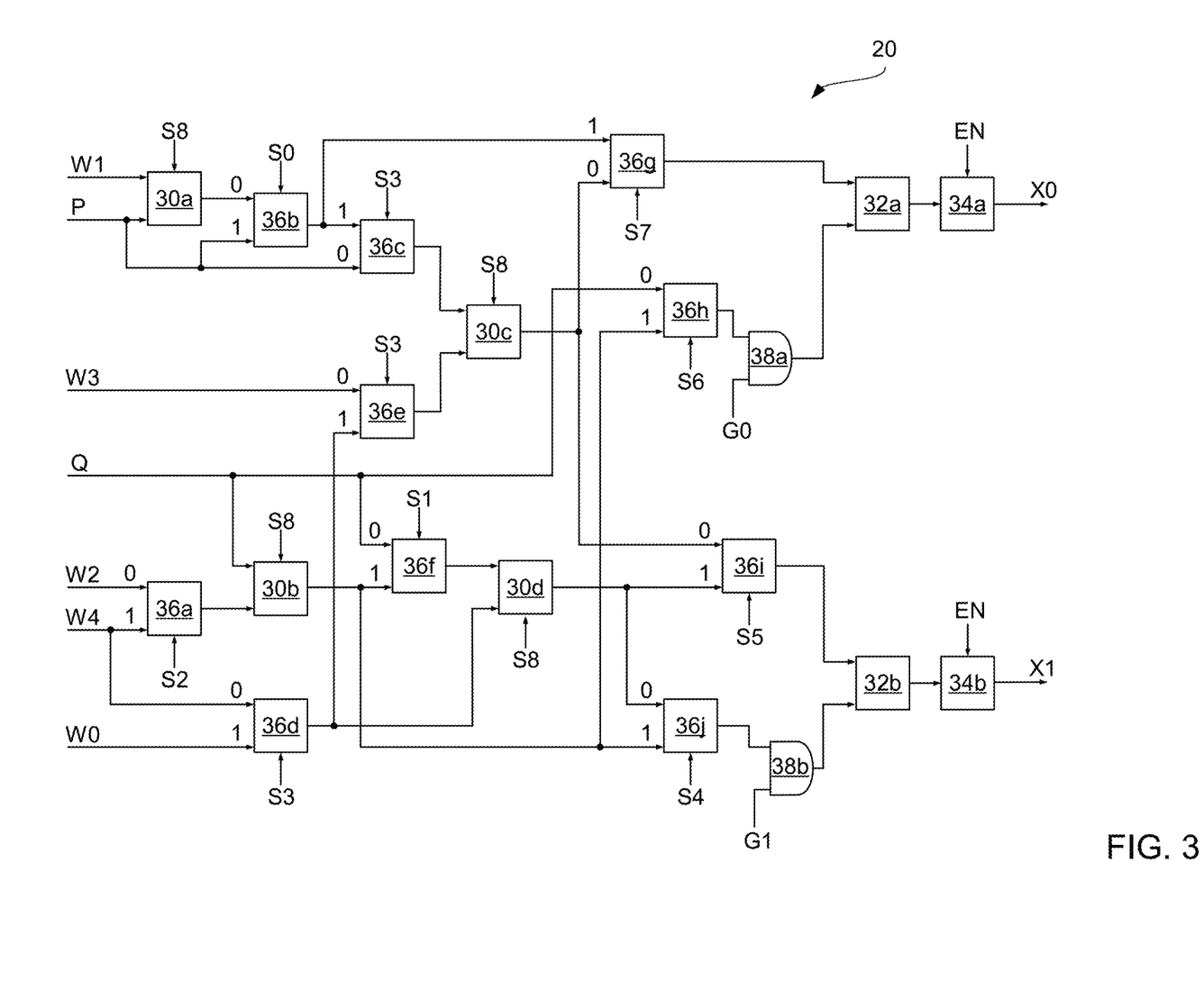
FIG. 3 is a circuit block diagram exemplary of a processing circuit according to one or more embodiments, for use in an electronic device according to embodiments.

FIG. 3 is a circuit block diagram exemplary of a computing circuit 20 as possibly included in one or more embodiments of a processing element 160.

As exemplified in FIG. 3, a computing circuit 20 may comprise a set of processing resources including, for instance, four complex/real multiplier circuits (30a, 30b, 30c, 30d), two complex adder-subtractor circuits (32a, 32b) and two accumulator circuits (34a, 34b) reconfigurably couplable as substantially illustrated in FIG. 3. For instance, reconfigurable coupling of the processing resources to form different datapaths, with different datapaths corresponding to different mathematical operations, may be obtained by means of multiplexer circuits (e.g., 36a to 36j), with each multiplexer receiving a respective control signal (e.g., S0 to S7).

In one or more embodiments, the multiplier circuits 30a, 30b, 30c, 30d may be configured (e.g., by means of internal multiplexer circuits not visible in the Figures) to operate according to two different configurations selectable as a function of a control signal S8 provided thereto. In a first configuration (e.g., if S8=0), a multiplier may compute the result of two real products on four real operands per clock cycle (i.e., each of the input signals carries two values which are both real values). In a second configuration (e.g., if S8=1), a multiplier may compute the result of one complex product on two complex operands per clock cycle (i.e., each of the input signals carries two values, where a first value is the real part of the operand and the second value is the imaginary part of the operand).

Table II provided in the following summarizes the exemplary possible configurations of the multiplier circuits 30a, 30b, 30c, 30d.

TABLE II

| | Output functioning | | |
|---|---|---|---|
| S8 | $Out_{re}$ (real) | $Out_{img}$ (imaginary) | Inputs |
| 0 | $Out_{re} =$ $In0_{re}*In1_{re}$ | $Out_{img} =$ $In0_{img}*In1_{img}$ | In0: 2 real data In1: 2 real data |
| 1 | $Out_{re} =$ Re(In0*In1) | $Out_{img} =$ Img(In0*In1) | In0: 1 complex data In1: 1 complex data |

By way of example and with reference to FIG. 3, the processing resources may be arranged as described in the following.

A first multiplier 30a may receive a first input signal W1 and a second input signal P (e.g., complex operands).

A second multiplier 30b may receive a first input signal Q and a second input signal selected out of the input signals W2 and W4 by means of a first multiplexer 36a, the first multiplexer 36a receiving a respective control signal S2. For instance, if S2=0 then the multiplier 30b receives signal W2 as second input, and if S2=1 then the multiplier 30b receives signal W4 as second input.

A third multiplier 30c may receive a first input signal selected out of the output signal from the first multiplier 30a and the input signal P.

For instance, as exemplified in FIG. 3, a second multiplexer 36b may provide as output, as a function of a respective control signal S0, either the output signal from the first multiplier 30a (e.g., if S0=0) or the input signal P (e.g., if S0=1). A third multiplexer 36c may provide as output to the first input of the third multiplier 30c, as a function of a respective control signal S3, either the output signal from the second multiplexer 36b (e.g., if S3=1) or the input signal P (e.g., if S3=0).

The third multiplier 30c may receive a second input signal selected out of the input signal W3, the input signal W4 and the input signal W0.

For instance, as exemplified in FIG. 3, a fourth multiplexer 36d may provide as output, as a function of a respective control signal S3, either the input signal W4 (e.g., if S3=0) or the input signal W0 (e.g., if S3=1). A fifth multiplexer 36e may provide as output to the second input of the third multiplier 30c, as a function of a respective control signal S3, either the input signal W3 (e.g., if S3=0) or the output signal from the fourth multiplexer 36d (e.g., if S3=1).

A fourth multiplier 30d may receive a first input signal selected out of the input signal Q and the output signal from the second multiplier 30b.

For instance, as exemplified in FIG. 3, a sixth multiplexer 36f may provide as output to the first input of the fourth multiplier 30d, as a function of a respective control signal S1, either the input signal Q (e.g., if S1=0) or the output signal from the second multiplier 30b (e.g., if S1=1).

The fourth multiplier 30d may receive a second input signal selected out of the input signal W4 and the input signal W0.

For instance, as exemplified in FIG. 3, the second input of the fourth multiplier 30d may be coupled to the output of the fourth multiplexer 36d.

A first adder-subtractor 32a may receive a first input signal selected out of the output signal from the first multiplier 30a, the input signal P and the output signal from the third multiplier 30c.

For instance, as exemplified in FIG. 3, a seventh multiplexer 36g may provide as output to the first input of the first adder-subtractor 32a, as a function of a respective control signal S7, either the output signal from the second multiplexer 36b (e.g., if S7=1) or the output signal from the third multiplier 30c (e.g., if S7=0).

The first adder-subtractor 32a may receive a second input signal selected out of the input signal Q, the output from the second multiplier 30b and a null signal (i.e., a binary signal equal to zero).

For instance, as exemplified in FIG. 3, an eighth multiplexer 36h may provide as output, as a function of a respective control signal S6, either the input signal Q (e.g., if S6=0) or the output signal from the second multiplier 30b (e.g., if S6=1). A first AND gate 38a may receive as first input signal the output signal from the eighth multiplexer 36h, and as second input signal a control signal G0. The output of the first AND gate 38a may be coupled to the second input of the first adder-subtractor 32a.

A second adder-subtractor 32b may receive a first input signal selected out of the output signal from the third multiplier 30c and the output signal from the fourth multiplier 30d.

For instance, as exemplified in FIG. 3, a ninth multiplexer 36i may provide as output to the first input of the second adder-subtractor 32b, as a function of a respective control signal S5, either the output signal from the third multiplier 30c (e.g., if S5=0) or the output signal from the fourth multiplier 30d (e.g., if S5=1).

The second adder-subtractor 32b may receive a second input signal selected out of the output from the fourth multiplier 30d, the output from the second multiplier 30b and a null signal (i.e., a binary signal equal to zero).

For instance, as exemplified in FIG. 3, a tenth multiplexer 36j may provide as output, as a function of a respective control signal S4, either the output signal from the fourth multiplier 30d (e.g., if S4=0) or the output signal from the second multiplier 30b (e.g., if S4=1). A second AND gate

38b may receive as first input signal the output signal from the tenth multiplexer 36j, and as second input signal a control signal G1. The output of the second AND gate 38b may be coupled to the second input of the second adder-subtractor 32b.

A first accumulator 34a may receive an input signal from the output of the first adder-subtractor 32a, and a control signal EN, to provide the first output signal X0 of the computing circuit 20.

A second accumulator 34b may receive an input signal from the output of the second adder-subtractor 32b, and a control signal EN, to provide the second output signal X1 of the computing circuit 20.

One or more embodiments comprising the adder-subtractors 32a, 32b may retain the capability of "bypassing" their operation by means of the AND gates 38a, 38b which may be used to force a null signal at the second input of the adder-subtractors 32a, 32b.

Figure 4:
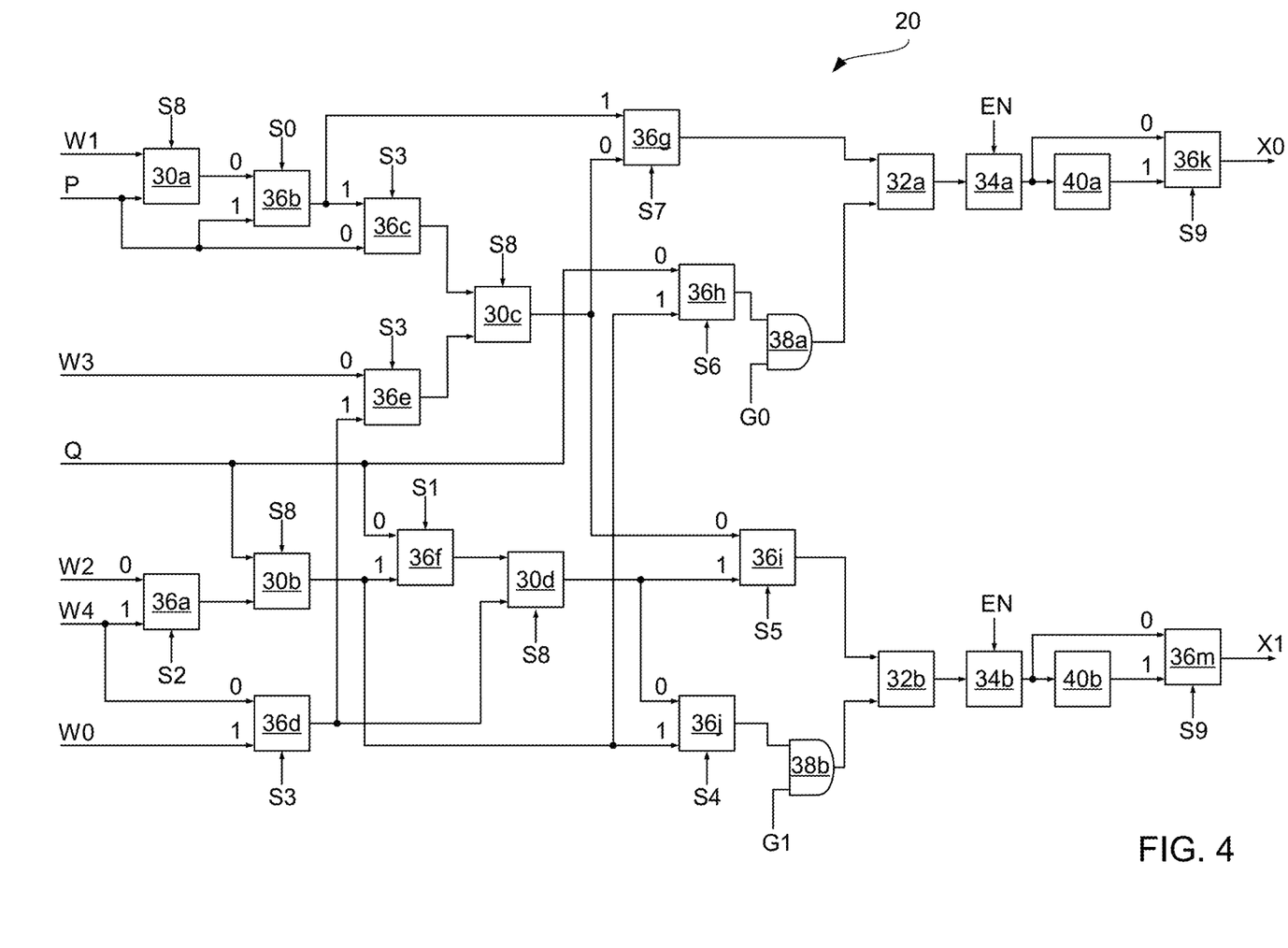
FIG. 4 is another circuit block diagram exemplary of a processing circuit according to one or more embodiments, for use in an electronic device according to embodiments.

FIG. 4 is a circuit block diagram exemplary of other embodiments of a computing circuit 20 as possibly included in one or more embodiments of a processing element 160.

One or more embodiments as exemplified in FIG. 4 may comprise the same arrangement of processing resources and multiplexer circuits as discussed with reference to FIG. 3, with the addition of two circuits 40a, 40b configured to compute activation non-linear functions (ANLF), and respective multiplexer circuits 36k, 36m.

By way of example and with reference to FIG. 4, the additional processing resources 40a, 40b may be arranged as described in the following.

A first ANLF circuit 40a may receive an input signal from the output of the first accumulator 34a. An eleventh multiplexer 36k may provide the first output signal X0 of the computing circuit 20 by selecting, as a function of a respective control signal S9, either the output signal from the first accumulator 34a (e.g., if S9=0) or the output signal from the first ANLF circuit 40a (e.g., if S9=1).

A second ANLF circuit 40b may receive an input signal from the output of the second accumulator 34b. A twelfth multiplexer 36m may provide the second output signal X1 of the computing circuit 20 by selecting, as a function of a respective control signal S9, either the output signal from the second accumulator 34b (e.g., if S9=0) or the output signal from the second ANLF circuit 40b (e.g., if S9=1).

Therefore, in one or more embodiments as exemplified in FIG. 4, the ANLF circuits 40a and 40b may be "bypassed" by means of the multiplexer circuits 36k and 36m, thereby providing an operation similar to embodiments as exemplified in FIG. 3.

Therefore, as exemplified with reference to FIGS. 3 and 4, the datapaths in the computing circuit 20 may be configured to support parallel computation and may facilitate execution of different functions. In one or more embodiments, the internal pipeline may be designed to meet timing constraints (e.g., clock frequency) versus a minimum latency.

In the following, various non-limiting examples of possible configurations of the computing circuit 20 are provided. In each example, the computing circuit 20 is configured to compute an algorithm-dependent (basic) function.

In a first example, configuration of a computing circuit 20 for performing a Fast Fourier Transform (FFT) algorithm is described.

In case a hardware accelerator circuit 16 is demanded to compute a FFT algorithm, a single processing element 160 can be programmed to implement a radix-2 DIF (Decimation In Frequency) butterfly algorithm performing the following complex operations, e.g., using signals coming from the internal control unit 161:

$$X0=P+Q$$

$$X1=P*W0-Q*W0$$

where W0 may be a twiddle factor stored inside a local read-only memory 165.

In the present first example, the input signals (P, Q, W0, W1, W2, W3, W4) and the output signals (X0, X1) may be complex data type.

Optionally, in order to reduce the effect on the spectrum of the discontinuities at the edges of the chunk of data on which the FIT algorithm is computed, a windowing function can be applied to the input data before computing the FFT algorithm. Such windowing processing may be supported by the processing element 160, e.g., by making use of four multiplier circuits.

Optionally, the module or phase of the spectrum component can be used in the place of the complex value (e.g., in applications such as radar target detection). In such case, the internal (optional) ANLF circuits can be used during the last FIT stage. For instance, it is possible to rotate the input complex vector so that it is aligned with the x-axis to compute the module.

Table III provided in the following summarizes some exemplary configurations of the computing circuit 20 for computing different radix-2 algorithms.

TABLE III

| | Configuration | | | | | | | | | | | | |
|---|---|---|---|---|---|---|---|---|---|---|---|---|---|
| Function | S0 | S1 | S2 | S3 | S4 | S5 | S6 | S7 | S8 | S9 | EN | G0 | G1 |
| Rdx-2 Butt. | 1 | 0 | — | 1 | 0 | 0 | 0 | 1 | 1 | 0 | 0 | 1 | 1 |
| Rdx-2 Butt. + Windowing | 0 | 1 | 0 | 1 | 0 | 0 | 1 | 1 | 1 | 0 | 0 | 1 | 1 |
| Rdx-2 Butt. + Module | 1 | 0 | — | 1 | 0 | 0 | 0 | 1 | 1 | 1 | 0 | 1 | 1 |

Therefore, the data flow corresponding to the function "Rdx-2 Butterfly" exemplified above may be the following:

$$X0=P+Q$$

$$X1=P*W0-Q*W0$$

The data flow corresponding to the function "Rdx-2 Butterfly+windowing" exemplified above may be the following:

$$X0=W1*P+W2*Q$$

$$X1=(W1*P)*W0-(W2*Q)*W0$$

The data flow corresponding to the function "Rdx-2 Butterfly+module" exemplified above may be the following:

$$X0 = \mathrm{abs}(P+Q)$$

$$X1 = \mathrm{abs}(P*W0 - Q*W0)$$

In the first example considered herein, the configuration corresponding to the function "Rdx-2 Butterfly" may involve using two multiplier circuits, two adder-subtractor circuits, no accumulators and no ANLF circuits.

In the first example considered herein, the configuration corresponding to the function "Rdx-2 Butterfly+windowing" may involve using four multiplier circuits, two adder-subtractor circuits, no accumulators and no ANLF circuits.

In the first example considered herein, the configuration corresponding to the function "Rdx-2 Butterfly+module" may involve using two multiplier circuits, two adder-subtractor circuits, no accumulators and two ANLF circuits.

In a second example, configuration of a computing circuit 20 for performing a scalar product of complex data vectors is described.

A hardware accelerator circuit 16 may be demanded to compute a scalar product of complex data vectors. For instance, this may be the case of applications involving a filtering operation, such as phased-array radar systems involving a processing stage called beamforming. Beamforming may facilitate a radar system to resolve targets also in the angular (azimuth) dimension, besides the range and radial velocity ones.

In the present second example, the input signals (P, Q, W0, W1, W2, W3, W4) and the output signals (X0, X1) may be complex data type.

In the present second example, two different scalar vector product operations (e.g., beamforming operations) may be concurrently carried out by a single processing element 160, e.g., by making use of all the internal hardware resources.

During beamforming operations, the local configurable coefficient memory 167 may be used to store the phase shifts for the different array antenna elements.

Similarly to the first example, also in the present second example an ANLF circuit may be optionally used if a module is to be computed instead of a complex value.

Table IV provided in the following exemplifies possible configurations of the computing circuit 20 for computing concurrently two scalar products of vectors.

Therefore, the data flow corresponding to the function "scalar product of vectors" exemplified above may be the following:

$$X0 = ACC(P*W1 + Q*W2)$$

$$X1 = ACC(P*W3 + Q*W4)$$

The data flow corresponding to the function "scalar product of vectors+module" exemplified above may be the following:

$$X0 = \mathrm{abs}(ACC(P*W1 + Q*W2))$$

$$X1 = \mathrm{abs}(ACC(P*W3 + Q*W4))$$

In the second example considered herein, the configuration corresponding to the function "scalar product of vectors" may involve using four multiplier circuits, two adder-subtractor circuits, two accumulators and no ANLF circuits.

In the second example considered herein, the configuration corresponding to the function "scalar product of vectors+module" may involve using four multiplier circuits, two adder-subtractor circuits, two accumulators and two ANLF circuits.

In a third example, configuration of a computing circuit 20 for performing a scalar product of real data vectors is described.

A hardware accelerator circuit 16 may be demanded to compute a scalar product of real data vectors on large real data structures, e.g., for the computation of a digital filter. For instance, in many applications a real-world (e.g., analog) signal may be subject to filtering after having been digitalized, in order to extract (only) the relevant information.

In the digital domain, a convolution operation between an input signal and a filter impulse response (FIR) may take the form of a scalar product of two real data vectors. One of the two vectors may hold the input data, while the other one may hold the coefficients that define the filtering operation.

In the present third example, the input signals (P, Q, W0, W1, W2, W3, W4) and the output signals (X0, X1) are real data type.

In the present third example, two different filtering operations may be concurrently carried out by a single processing element 160 on the same data set, processing four different input data per clock cycle, e.g., by making use of all the internal hardware resources.

Table V provided in the following exemplifies a possible configuration of the computing circuit 20 for computing concurrently two filtering operations on real data vectors.

TABLE IV

| Function | Configuration | | | | | | | | | | | | |
|---|---|---|---|---|---|---|---|---|---|---|---|---|---|
| | S0 | S1 | S2 | S3 | S4 | S5 | S6 | S7 | S8 | S9 | EN | G0 | G1 |
| 2x scalar product of vectors (complex) | 0 | 0 | 0 | 0 | 0 | 0 | 1 | 1 | 1 | 0 | 1 | 1 | 1 |
| 2x scalar product of vectors (complex) + Module | 0 | 0 | 0 | 0 | 0 | 0 | 1 | 1 | 1 | 1 | 1 | 1 | 1 |

TABLE V

| Function | Configuration | | | | | | | | | | | | |
|---|---|---|---|---|---|---|---|---|---|---|---|---|---|
| | S0 | S1 | S2 | S3 | S4 | S5 | S6 | S7 | S8 | S9 | EN | G0 | G1 |
| 2x scalar product of vectors (real) | 0 | 0 | 0 | 0 | 0 | 0 | 1 | 1 | 0 | 0 | 1 | 1 | 1 |

Therefore, the data flow corresponding to the functions exemplified above is the following, where subscript "h" stands for the MSB part, and subscript "l" stands for the LSB part:

$$X0_h = ACC(P_h * W1_h + Q_h * W2_h)$$

$$X0_l = ACC(P_l * W1_l + Q_l * W2_l)$$

$$X1_h = ACC(P_h * W3_h + Q_h * W4_h)$$

$$X1_l = ACC(P_l * W3_l + Q_l * W4_l)$$

In the third example considered herein, the configuration corresponding to the function "scalar product of real vectors" may involve using four multiplier circuits, two adder-subtractor circuits, two accumulators and no ANLF circuits.

In a fourth example, configuration of a computing circuit 20 for computing non-linear functions is described.

Multilayer Perceptron (MLP) is a class of fully-connected feedforward artificial neural networks, which may comprise at least three layers of nodes/neurons. Each neuron, except the ones in the input layer, computes a weighted sum of all the nodes in the previous layer and then applies a non-linear activation function to the result. A processing element 160 as disclosed herein may handle such non-linear functions, e.g., using the internal ANLF circuits. Typically, neural networks deal with data coming from the real world and use real weights and functions to compute class membership probabilities (the outputs of the last layer). Real data scalar products may thus be the most computationally demanding and most frequently used operations for such kind of artificial networks.

Figure 5:
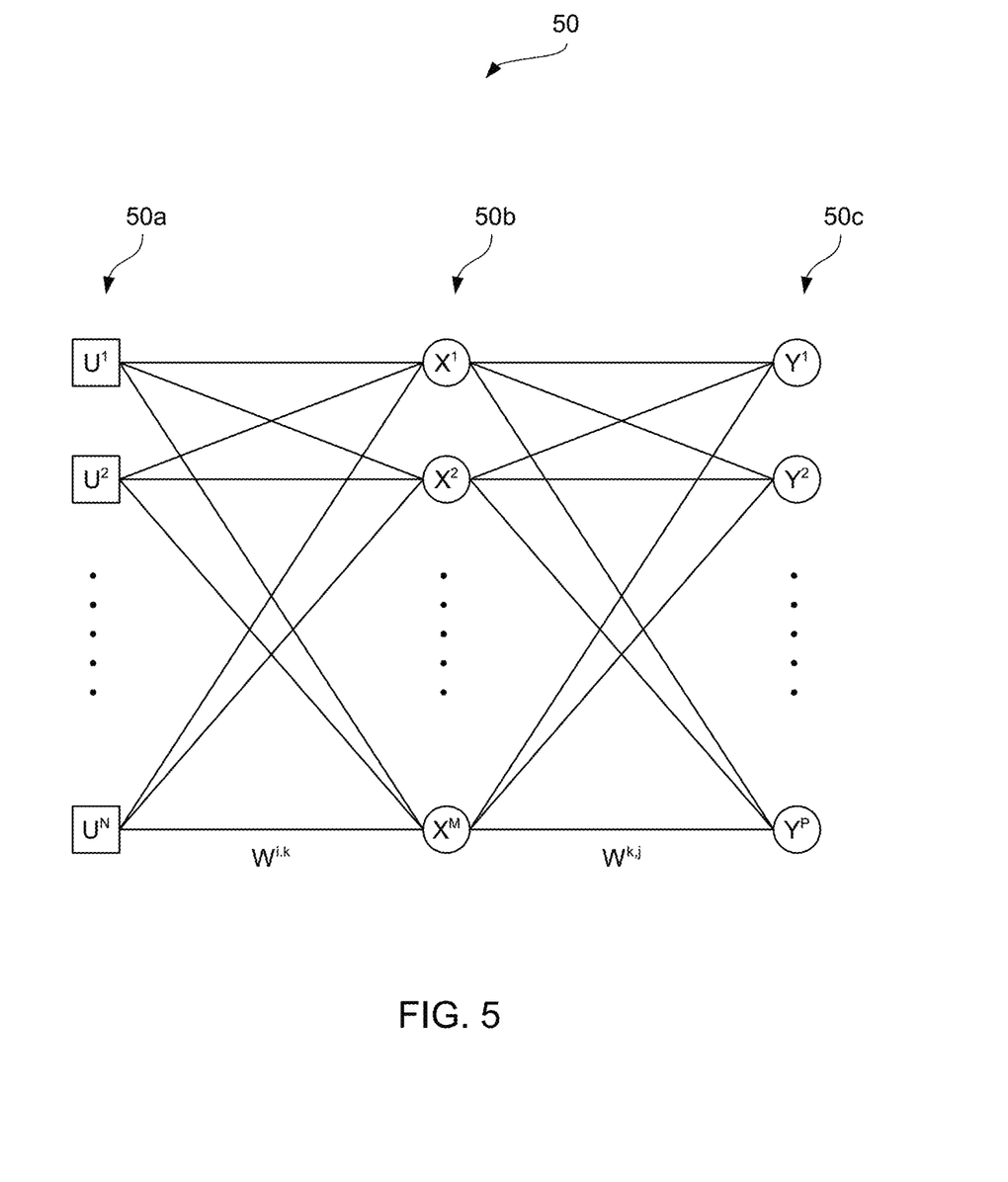
FIG. 5 is a diagram exemplary of a structure of a Multilayer Perceptron network.

FIG. 5 is a diagram exemplary of a typical structure of a Multilayer Perceptron network 50.

As exemplified in FIG. 5, a Multilayer Perceptron network 50 may include an input layer 50a comprising a number N of inputs $U^1, \ldots, U^N$ ($U^i$, i=1, ..., N), a hidden layer 50b comprising a number M of hidden nodes $X^1, \ldots, X^M$ ($X^k$, k=1, ..., M), and an output layer 50c comprising a number P of output nodes $Y^1, \ldots, Y^P$ ($Y^j$, j=1, ..., P).

It will be understood that in one or more embodiments, a Multilayer Perceptron network may comprise more than one hidden layer 50b.

As exemplified in FIG. 5, a Multilayer Perceptron network 50 may include a first set of N*M weights $W^{i,k}$ between the inputs $U^1, \ldots, U^N$ and the hidden nodes $X^1, \ldots, X^M$, and a second set of M*P weights $W^{k,j}$ between the hidden nodes $X^1, \ldots, X^M$ and the output nodes $Y^1, \ldots, Y^P$.

The values stored in the inputs $U^i$, in the hidden nodes $X^k$ and in the output nodes $Y^j$ may be computed, for instance, as MAC floating points with single precision.

The values of the hidden nodes $X^k$ and of the output nodes Y may be computed according to the following equations:

$$X^k = f\left(\sum_{i=1}^{N} (U^i W^{i,k})\right)$$

$$Y^j = f\left(\sum_{i=1}^{M} (X^i W^{k,j})\right)$$

In the present fourth example, the trained real weights associated to all the edges of a MLP can be stored inside the local configurable coefficient memory 167. The real layer inputs may be retrieved from the local data memory of the hardware accelerator circuit 16 (e.g., the local data memory banks $M_0, \ldots, M_{Q-1}$) and the real layer outputs may be stored into the local data memory of the hardware accelerator circuit 16.

As a result of a MLP model being mapped onto the hardware accelerator circuit 16, each of the processing elements 160 included therein (e.g., a number P of processing elements) may be used to compute the scalar product and the activation function output associated to two different neurons of the same layer, e.g., handling four edges per clock cycle. As a result, all the processing elements $160_0$, $160_1, \ldots, 160_{P-1}$ may be used concurrently.

Table VI provided in the following exemplifies a possible configuration of the computing circuit 20 for computing concurrently two activation function outputs associated to two different neurons.

TABLE VI

| Function | Configuration | | | | | | | | | | | | |
|---|---|---|---|---|---|---|---|---|---|---|---|---|---|
| | S0 | S1 | S2 | S3 | S4 | S5 | S6 | S7 | S8 | S9 | EN | G0 | G1 |
| MLP computation engine | 0 | 0 | 0 | 0 | 0 | 0 | 1 | 1 | 0 | 1 | 1 | 1 | 1 |

Therefore, the data flow corresponding to the functions exemplified above is the following, where subscript "h" stands for the MSB part, and subscript "l" stands for the LSB part:

$$X0_h = f(ACC(P_h * W1_h + Q_h * W2_h))$$

$$X0_l = f(ACC(P_l * W1_l + Q_l * W2_l))$$

$$X1_h = f(ACC(P_h * W3_h + Q_h * W4_h))$$

$$X1_l = f(ACC(P_l * W3_l + Q_l * W4_l))$$

In the fourth example considered herein, the configuration corresponding to the function "MLP computation engine" (which may comprise computing two scalar products of vectors and applying thereto a non-linear activation function) may involve using four multiplier circuits, two adder-subtractor circuits, two accumulators and two ANLF circuits.

Table VII provided in the following exemplifies non-linear functions which may be implemented in one or more embodiments. Some functions indicated with "Algorithm=NN" may be specifically used in the context of neural networks.

TABLE VII

| Name | Function | Algorithm |
|---|---|---|
| Sigmoid (σ) Logistic function | $f(x) = \dfrac{1}{1 + e^{-x}}$ | NN |
| tanh hyperbolic tangent | $f(x) = \dfrac{e^x - e^{-x}}{e^x + e^{-x}}$ | NN |
| ReLU Rectified Linear Unit | $f(x) = \begin{cases} 0 \text{ for } x < 0 \\ x \text{ for } x \geq 0 \end{cases}$ | NN |
| Softmax | $f(x)_i = \dfrac{e^{x_i}}{\sum_k e^{x_k}}$ | NN |
| Leaky_ReLU | $f(x) = \begin{cases} \alpha x \text{ for } x < 0 \\ x \text{ for } x \geq 0 \end{cases}$ | NN |
| SELU Scaled ELU | $f(x) = \lambda \cdot \begin{cases} \alpha(e^x - 1) \text{ for } x < 0 \\ x \text{ for } x \geq 0 \end{cases}$ | NN |
| Hard sigmoid | $f(x) = \begin{cases} 0 \text{ for } x < 2.5 \\ 0.2x + 0.5 \text{ for } -2.5 \leq x \leq 2.5 \\ 1 \text{ for } x > 2.5 \end{cases}$ | NN |
| ELU Exponential LU | $f(x) = \begin{cases} (e^x - 1) \text{ for } x < 0 \\ x \text{ for } x \geq 0 \end{cases}$ | NN |
| Log (x) | $f(x) = \log(x) \text{ for } x \geq 0$ | |
| Sin(x) | $f(x) = \sin(x)$ | |
| Cos(x) | $f(x) = \cos(x)$ | |
| Abs(x) | $f(x) = \begin{cases} -x \text{ for } x < 0 \\ x \text{ for } x \geq 0 \end{cases}$ | |
| Sqrt(x) | $f(x) = \sqrt{x} \text{ for } x \geq 0$ | |
| Module (z = re + im) | $m(z) = \sqrt{\text{re}^2 + \text{im}^2}$ | |
| Phase (z = re + im) | $ph(z) = \arctan\dfrac{\text{im}}{\text{re}}$ | |

Therefore, one or more embodiments of a hardware accelerator circuit 16 comprising at least one computing circuit 20 as exemplified herein and/or in the examples above may facilitate implementing a digital signal processing system with one or more of the following advantages: flexibility (e.g., capability of handling different types of algorithms), improved usage of hardware resources, improved performance for parallel computation, extended connectivity and high bandwidth of each processing element 160 to the local data memory banks $M_0, \ldots, M_{Q-1}$ and/or to the system memory 12 through a simple local interconnect network 162 and internal direct memory access controllers $168_0, 168_1, \ldots, 168_{P-1}$, and scalable architecture to support additional algorithms by the integration of different processing elements.

In one or more embodiments, the electronic system 1 may be implemented as an integrated circuit in a single silicon chip or die (e.g., as a system-on-chip). Alternatively, the electronic system 1 may be a distributed system comprising a plurality of integrated circuits interconnected together, e.g., by means of a printed circuit board (PCB).

As exemplified herein, a circuit (e.g., 160) may comprise a set of input terminals configured to receive a respective set of input digital signals carrying input data (e.g., P, Q, W0, W1, W2, W3, W4), a set of output terminals configured to provide a respective set of output digital signals carrying output data (e.g., X0, X1), and computing circuitry (e.g., 20) configured to produce the output data as a function of the input data. The computing circuitry may comprise: a set of multiplier circuits (e.g., 30a, 30b, 30c, 30d), a set of adder-subtractor circuits (e.g., 32a, 32b), a set of accumulator circuits (e.g., 34a, 34b), and a configurable interconnect network (e.g., 36a, ..., 36j) configured to selectively couple (e.g., S1, ..., S7) the multiplier circuits, the adder-subtractor circuits, the accumulator circuits, the input terminals and the output terminals in at least two processing configurations.

As exemplified herein, in a first processing configuration the computing circuitry may be configured to compute the output data according to a first set of functions, and in at least one second processing configuration the computing circuitry may be configured to compute the output data according to a respective second set of functions, the respective second set of functions being different from the first set of functions.

As exemplified herein, a circuit may comprise respective configurable read direct memory access controllers (e.g., $200_0$, $200_1$) coupled to a first subset of the set of input terminals to receive (e.g., 162, 163) a respective first subset of the input digital signals carrying a first subset of input data (e.g., P, Q). The configurable read direct memory access controllers may be configured to control fetching of the first subset of input data from a memory (e.g., $M_0, \ldots, M_{Q-1}$).

As exemplified herein, a circuit may comprise respective configurable write direct memory access controllers (e.g., $204_0$, $204_1$) coupled to the set of output terminals for providing the output digital signals carrying output data. The configurable write direct memory access controllers may be configured to control storage of the output data into the memory.

As exemplified herein, a circuit may comprise respective input buffer registers (e.g., $202_0$, $202_1$) coupled to the configurable read direct memory access controllers and respective output buffer registers (e.g., $206_0$, $206_1$) coupled to the configurable write direct memory access controllers.

As exemplified herein, a circuit may comprise a ROM address generator circuit (e.g., 208) configured to control fetching of a second subset of input data (e.g., W0) from at least one read-only memory (e.g., 164, 165) via a second subset of the input digital signals, and/or a memory address generator circuit (e.g., 210) configured to control fetching of a third subset of input data (e.g., W1, W2, W3, W4) from at least one configurable memory (e.g., 166, 167) via a third subset of the input digital signals.

As exemplified herein, in a circuit according to embodiments the set of multiplier circuits may comprise a first multiplier circuit (e.g., 30*a*), a second multiplier circuit (e.g., 30*b*), a third multiplier circuit (e.g., 30*c*) and a fourth multiplier circuit (e.g., 30*d*). The set of adder-subtractor circuits may comprise a first adder-subtractor circuit (e.g., 32*a*) and a second adder-subtractor circuit (32*b*). The set of accumulator circuits may comprise a first accumulator circuit (e.g., 34*a*) and a second accumulator circuit (e.g., 34*b*).

As exemplified herein, the first multiplier circuit may receive as a first operand a first input signal (e.g., W1) of the set of input digital signals, and may receive as a second operand a second input signal (e.g., P) of the set of input digital signals. The second multiplier circuit may receive as a first operand a third input signal (e.g., Q) of the set of input digital signals, and may receive as a second operand a signal selectable out of a fourth input signal (e.g., W2) and a fifth input signal (e.g., W4) of the set of input digital signals. The third multiplier circuit may receive as a first operand a signal selectable out of an output signal from the first multiplier circuit and the second input signal, and may receive as a second operand a signal selectable out of a sixth input signal (e.g., W3), a seventh input signal (e.g., W0) and the fifth input signal. The fourth multiplier circuit may receive as a first operand a signal selectable out of an output signal from the second multiplier and the third input signal, and may receive as a second operand a signal selectable out of the fifth input signal and the seventh input signal. The first adder-subtractor circuit may receive as a first operand a signal selectable out of the output signal from the first multiplier circuit, the second input signal and the output signal from the third multiplier circuit, and may receive as a second operand a signal selectable out of the third input signal, the output signal from the second multiplier circuit and a null signal. The second adder-subtractor circuit may receive as a first operand a signal selectable out of the output signal from the third multiplier circuit and the output signal from the fourth multiplier circuit, and may receive as a second operand a signal selectable out of the output signal from the fourth multiplier circuit, the output signal from the second multiplier circuit and a null signal. The first accumulator circuit may receive as input an output signal from the first adder-subtractor circuit, and the second accumulator circuit may receive as input an output signal from the second adder-subtractor circuit. The first accumulator circuit may be selectively activatable (e.g., EN) to provide a first output signal (e.g., X0) and the second accumulator circuit may be selectively activatable to provide a second output signal (e.g., X1).

As exemplified herein, the computing circuitry may comprise a set of circuits configured to compute non-linear functions (e.g., 40*a*, 40*b*).

As exemplified herein, the set of circuits configured to compute non-linear functions may comprise a first circuit configured to compute non-linear functions (e.g., 40*a*) and a second circuit configured to compute non-linear functions (e.g., 40*b*). The first circuit configured to compute non-linear functions may receive as input an output signal from the first accumulator circuit. The second circuit configured to compute non-linear functions may receive as input an output signal from the second accumulator circuit. The first output signal may be selectable (e.g., 36*k*) between the output signal from the first accumulator circuit and the output signal from the first circuit configured to compute non-linear functions, and the second output signal may be selectable (e.g., 36*m*) between the output signal from the second accumulator circuit and the output signal from the second circuit configured to compute non-linear functions.

As exemplified herein, a device (e.g., 16) may comprise a set of circuits according to one or more embodiments, a set of data memory banks (e.g., $M_0, \ldots, M_{Q-1}$) and a control unit (e.g., 161). The circuits may be configurable (e.g., 161, 168) to read data from and write data into the data memory banks via an interconnect network (e.g., 162, 163) as a function of configuration data stored in the control unit.

As exemplified herein, the data memory banks may comprise buffering registers, preferably double buffering registers.

As exemplified herein, a system (e.g., 1) may comprise a device according to one or more embodiments and a processing unit (e.g., 1*o*) coupled to the device via a system interconnect (e.g., 18). The circuits in the set of circuits of the device may be configurable in at least two processing configurations as a function of a control signal received from the processing unit.

As exemplified herein, a method of operating a circuit according to one or more embodiments, a device according to one or more embodiments, or a system according to one or more embodiments may comprise partitioning the operation time of the computing circuitry in at least first and second operation intervals, wherein the computing circuitry is operated in the first processing configuration and the at least one second processing configuration, respectively.

Without prejudice to the underlying principles, the details and embodiments may vary, even significantly, with respect to what has been described by way of example only, without departing from the extent of protection.

The extent of protection is defined by the annexed claims.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A circuit comprising:
   a set of input terminals configured to receive a set of respective input digital signals carrying input data;
   respective configurable read direct memory access controllers coupled to a first subset of the set of input terminals to receive a respective first subset of the input digital signals carrying a first subset of input data, wherein the configurable read direct memory access controllers are configured to control fetching of the first subset of input data from a memory;
   a set of output terminals configured to provide a set of respective output digital signals carrying output data;
   respective configurable write direct memory access controllers coupled to the set of output terminals for providing the output digital signals carrying the output data, wherein the configurable write direct memory access controllers are configured to control storage of the output data into the memory; and
   computing circuitry configured to produce the output data as a function of the input data, wherein the computing circuitry comprises:
   a set of multiplier circuits;
   a set of adder-subtractor circuits;
   a set of accumulator circuits; and
   a configurable interconnect network configured to selectively couple the multiplier circuits, the adder-subtractor circuits, the accumulator circuits, the input terminals and the output terminals in at least two processing configurations;

wherein:
in a first processing configuration, the computing circuitry is configured to compute the output data according to a first set of functions; and
in at least one second processing configuration, the computing circuitry is configured to compute the output data according to a respective second set of functions, the respective second set of functions being different from the first set of functions.

2. The circuit of claim 1, further comprising respective input buffer registers coupled to the configurable read direct memory access controllers and respective output buffer registers coupled to the configurable write direct memory access controllers.

3. The circuit of claim 1, further comprising:
a read only memory (ROM) address generator circuit configured to control fetching of a second subset of input data from at least one read-only memory via a second subset of the input digital signals; and/or
a memory address generator circuit configured to control fetching of a third subset of input data from at least one local configurable memory via a third subset of the input digital signals.

4. The circuit of claim 1, wherein the set of multiplier circuits comprises a first multiplier circuit, a second multiplier circuit, a third multiplier circuit and a fourth multiplier circuit, the set of adder-subtractor circuits comprises a first adder-subtractor circuit and a second adder-subtractor circuit, and the set of accumulator circuits comprises a first accumulator circuit and a second accumulator circuit, and wherein:
the first multiplier circuit receives as a first operand a first input signal of the set of respective input digital signals, and receives as a second operand a second input signal of the set of respective input digital signals;
the second multiplier circuit receives as a first operand a third input signal of the set of respective input digital signals, and receives as a second operand a signal selectable out of a fourth input signal and a fifth input signal of the set of respective input digital signals;
the third multiplier circuit receives as a first operand a signal selectable out of an output signal from the first multiplier circuit and the second input signal, and receives as a second operand a signal selectable out of a sixth input signal, a seventh input signal and the fifth input signal;
the fourth multiplier circuit receives as a first operand a signal selectable out of an output signal from the second multiplier circuit and the third input signal, and receives as a second operand a signal selectable out of the fifth input signal and the seventh input signal;
the first adder-subtractor circuit receives as a first operand a signal selectable out of the output signal from the first multiplier circuit, the second input signal and the output signal from the third multiplier circuit, and receives as a second operand a signal selectable out of the third input signal, the output signal from the second multiplier circuit and a null signal;
the second adder-subtractor circuit receives as a first operand a signal selectable out of the output signal from the third multiplier circuit and the output signal from the fourth multiplier circuit, and receives as a second operand a signal selectable out of the output signal from the fourth multiplier circuit, the output signal from the second multiplier circuit and a null signal;
the first accumulator circuit receives as input an output signal from the first adder-subtractor circuit;
the second accumulator circuit receives as input an output signal from the second adder-subtractor circuit; and
the first accumulator circuit is selectively activatable to provide a first output signal and the second accumulator circuit is selectively activatable to provide a second output signal.

5. The circuit of claim 4, wherein the computing circuitry comprises a set of function circuits configured to compute non-linear functions.

6. The circuit of claim 5, wherein the set of function circuits configured to compute non-linear functions comprises a first circuit configured to compute non-linear functions and a second circuit configured to compute non-linear functions, and wherein:
the first circuit configured to compute non-linear functions receives as input an output signal from the first accumulator circuit;
the second circuit configured to compute non-linear functions receives as input an output signal from the second accumulator circuit;
the first output signal is selectable between the output signal from the first accumulator circuit and the output signal from the first circuit configured to compute non-linear functions; and
the second output signal is selectable between the output signal from the second accumulator circuit and the output signal from the second circuit configured to compute non-linear functions.

7. A device comprising:
a set of data memory banks;
a control unit;
an interconnect network;
a set of circuits, each circuit comprising:
a set of input terminals configured to receive a set of respective input digital signals carrying input data;
a set of output terminals configured to provide a set of respective output digital signals carrying output data; and
computing circuitry configured to produce the output data as a function of the input data, wherein the computing circuitry comprises:
a set of multiplier circuits;
a set of adder-subtractor circuits;
a set of accumulator circuits; and
a configurable interconnect network configured to selectively couple the multiplier circuits, the adder-subtractor circuits, the accumulator circuits, the input terminals and the output terminals in at least two processing configurations; and
at least one of:
a read only memory (ROM) address generator circuit configured to control fetching of a first subset of input data from at least one read-only memory via a first subset of the input digital signals; or
a memory address generator circuit configured to control fetching of a second subset of input data from at least one local configurable memory via a second subset of the input digital signals;
wherein:
in a first processing configuration, the computing circuitry is configured to compute the output data according to a first set of functions; and in at least one second processing configuration, the computing circuitry is configured to compute the output data according to a respective second set of functions, the respective second set of functions being different from the first set of functions; and wherein the set of circuits is configurable to read data from and write data into the data memory banks via the interconnect network as a function of configuration data stored in the control unit.

8. The device of claim 7, wherein the data memory banks comprise buffering registers.

9. The device of claim 8, wherein the buffering registers are double buffering registers.

10. The device of claim 7, further comprising:
respective configurable read direct memory access controllers coupled to a third subset of the set of input terminals to receive a respective first third subset of the input digital signals carrying a first third subset of input data, wherein the configurable read direct memory access controllers are configured to control fetching of the first third subset of input data from a memory; and
respective configurable write direct memory access controllers coupled to the set of output terminals for providing the output digital signals carrying the output data, wherein the configurable write direct memory access controllers are configured to control storage of the output data into the memory.

11. The device of claim 10, further comprising respective input buffer registers coupled to the configurable read direct memory access controllers and respective output buffer registers coupled to the configurable write direct memory access controllers.

12. The device of claim 7, wherein the set of multiplier circuits comprises a first multiplier circuit, a second multiplier circuit, a third multiplier circuit and a fourth multiplier circuit, the set of adder-subtractor circuits comprises a first adder-subtractor circuit and a second adder-subtractor circuit, and the set of accumulator circuits comprises a first accumulator circuit and a second accumulator circuit, and wherein:
the first multiplier circuit receives as a first operand a first input signal of the set of respective input digital signals, and receives as a second operand a second input signal of the set of respective input digital signals;
the second multiplier circuit receives as a first operand a third input signal of the set of respective input digital signals, and receives as a second operand a signal selectable out of a fourth input signal and a fifth input signal of the set of respective input digital signals;
the third multiplier circuit receives as a first operand a signal selectable out of an output signal from the first multiplier circuit and the second input signal, and receives as a second operand a signal selectable out of a sixth input signal, a seventh input signal and the fifth input signal;
the fourth multiplier circuit receives as a first operand a signal selectable out of an output signal from the second multiplier circuit and the third input signal, and receives as a second operand a signal selectable out of the fifth input signal and the seventh input signal;
the first adder-subtractor circuit receives as a first operand a signal selectable out of the output signal from the first multiplier circuit, the second input signal and the output signal from the third multiplier circuit, and receives as a second operand a signal selectable out of the third input signal, the output signal from the second multiplier circuit and a null signal;
the second adder-subtractor circuit receives as a first operand a signal selectable out of the output signal from the third multiplier circuit and the output signal from the fourth multiplier circuit, and receives as a second operand a signal selectable out of the output signal from the fourth multiplier circuit, the output signal from the second multiplier circuit and a null signal;
the first accumulator circuit receives as input an output signal from the first adder-subtractor circuit;
the second accumulator circuit receives as input an output signal from the second adder-subtractor circuit; and
the first accumulator circuit is selectively activatable to provide a first output signal and the second accumulator circuit is selectively activatable to provide a second output signal.

13. The device of claim 12, wherein the computing circuitry comprises a set of function circuits configured to compute non-linear functions.

14. The device of claim 13, wherein the set of function circuits configured to compute non-linear functions comprises a first circuit configured to compute non-linear functions and a second circuit configured to compute non-linear functions, and wherein:
the first circuit configured to compute non-linear functions receives as input an output signal from the first accumulator circuit;
the second circuit configured to compute non-linear functions receives as input an output signal from the second accumulator circuit;
the first output signal is selectable between the output signal from the first accumulator circuit and the output signal from the first circuit configured to compute non-linear functions; and
the second output signal is selectable between the output signal from the second accumulator circuit and the output signal from the second circuit configured to compute non-linear functions.

15. A system comprising:
a system interconnect;
a processing unit;
a device coupled to the processing unit via the system interconnect, wherein the device comprises:
a set of data memory banks;
a control unit;
an interconnect network; and
a set of circuits, each circuit comprising:
a set of input terminals configured to receive a set of respective input digital signals carrying input data;
respective configurable read direct memory access controllers coupled to a first subset of the set of input terminals to receive a respective first subset of the input digital signals carrying a first subset of input data, wherein the configurable read direct memory access controllers are configured to control fetching of the first subset of input data from a memory;
a set of output terminals configured to provide a set of respective output digital signals carrying output data;
respective configurable write direct memory access controllers coupled to the set of output terminals for providing the output digital signals carrying the output data, wherein the configurable write direct memory access controllers are configured to control storage of the output data into the memory; and computing circuitry configured to produce the output data as a function of the input data, wherein the computing circuitry comprises:
    a set of multiplier circuits;
    a set of adder-subtractor circuits;
    a set of accumulator circuits; and
    a configurable interconnect network configured to selectively couple the multiplier circuits, the adder-subtractor circuits, the accumulator circuits, the input terminals and the output terminals in at least two processing configurations;
    wherein:
        in a first processing configuration, the computing circuitry is configured to compute the output data according to a first set of functions; and
        in at least one second processing configuration, the computing circuitry is configured to compute the output data according to a respective second set of functions, the respective second set of functions being different from the first set of functions;
    wherein the set of circuits is configurable to read data from and write data into the data memory banks via the interconnect network as a function of configuration data stored in the control unit; and
    wherein the set of circuits are configurable in at least two processing configurations as a function of a control signal received from the processing unit.

16. The system of claim 15, wherein the data memory banks comprise buffering registers.

17. The system of claim 16, wherein the buffering registers are double buffering registers.

18. A method of operating a circuit, the method comprising:
    receiving, by a set of input terminals, a set of respective input digital signals carrying input data, the receiving comprising at least one of:
        (1) controlling, by a read only memory (ROM) address generator circuit fetching of a first subset of the input data from at least one read-only memory via a first subset of the input digital signals; or
        (2) controlling, by a memory address generator circuit, fetching of a second subset of the input data from at least one local configurable memory via a second subset of the input digital signals;
    receiving, from the set of input terminals, the input data, by computing circuitry comprising a set of multiplier circuits, a set of adder-subtractor circuits, and a set of accumulator circuits;
    partitioning an operation time of the computing circuitry into at least first and second operation intervals;
    selectively coupling, by a configurable interconnect network, the multiplier circuits, the adder-subtractor circuits, the accumulator circuits, the input terminals and output terminals in at least two processing configurations;
    computing, by the computing circuitry in the first operation intervals, output data according to a first set of functions in a first processing configuration of the at least two processing configurations;
    computing, by the computing circuitry in the second operation intervals, the output data according to a respective second set of functions in at least one second processing configuration of the at least two processing configurations, the respective second set of functions being different from the first set of functions; and
    providing, by a set of output terminals, a set of respective output digital signals carrying the output data.

19. The method of claim 18, further comprising:
    receiving, by respective configurable read direct memory access controllers from a third subset of the set of input terminals, a respective third subset of the input digital signals carrying a third subset of input data; and
    controlling, by the configurable read direct memory access controllers, fetching of the third subset of input data from a memory;
    providing, by respective configurable write direct memory access controllers to the set of output terminals, the output digital signals carrying the output data; and
    controlling, by the configurable write direct memory access controllers, storage of the output data into the memory.

20. The method of claim 18, further comprising:
    receiving, by a first multiplier circuit, a first input signal of the set of respective input digital signals;
    receiving, by the first multiplier circuit, a second input signal of the set of respective input digital signals;
    receiving, by a second multiplier circuit, a third input signal of the set of respective input digital signals;
    receiving, by the second multiplier circuit, a signal selectable out of a fourth input signal and a fifth input signal of the set of respective input digital signals;
    receiving, by a third multiplier circuit, a signal selectable out of an output signal from the first multiplier circuit and the second input signal;
    receiving, by the third multiplier circuit, a signal selectable out of a sixth input signal, a seventh input signal and the fifth input signal;
    receiving, by a fourth multiplier circuit, a signal selectable out of an output signal from the second multiplier circuit and the third input signal;
    receiving, by the fourth multiplier circuit, a signal selectable out of the fifth input signal and the seventh input signal;
    receiving, by a first adder-subtractor circuit, a signal selectable out of the output signal from the first multiplier circuit, the second input signal and the output signal from the third multiplier circuit;
    receiving, by the first adder-subtractor circuit, a signal selectable out of the third input signal, the output signal from the second multiplier circuit and a null signal;
    receiving, by a second adder-subtractor circuit, a signal selectable out of the output signal from the third multiplier circuit and the output signal from the fourth multiplier circuit;
    receiving, by the second adder-subtractor circuit, a signal selectable out of the output signal from the fourth multiplier circuit, the output signal from the second multiplier circuit and a null signal;
    receiving, by a first accumulator circuit, an output signal from the first adder-subtractor circuit;
    receiving, by a second accumulator circuit, an output signal from the second adder-subtractor circuit;
    selectively activating the first accumulator circuit to provide a first output signal; and
    selectively activating the second accumulator circuit to provide a second output signal.

\* \* \* \* \*